United States Patent [19]

Gross et al.

[11] 3,926,891

[45] Dec. 16, 1975

[54] METHOD FOR MAKING A CROSSLINKABLE AQUEOUS SOLUTION WHICH IS USEFUL TO FORM SOFT, WATER-SWELLABLE POLYACRYLATE ARTICLES

[75] Inventors: James R. Gross, Lake Jackson; Russell T. McFadden, Freeport, both of Tex.

[73] Assignee: The Dow Chemical Company, Midland, Mich.

[22] Filed: Mar. 13, 1974

[21] Appl. No.: 450,650

[52] U.S. Cl. ............... 260/29.6 E; 260/29.6 TA; 260/78.5 R; 260/89.5 S; 260/29.6 SQ
[51] Int. Cl.² ............... C08L 31/02; C08L 33/02
[58] Field of Search .. 260/78.5 R, 29.6 TA, 29.6 H, 260/29.6 E, 89.5 S, 29.6 SQ

[56] References Cited

UNITED STATES PATENTS

| | | | |
|---|---|---|---|
| 2,649,439 | 8/1953 | Brown | 260/89.5 S |
| 3,245,933 | 4/1966 | Muskrat | 260/29.6 N |
| 3,514,419 | 5/1970 | Darlow et al. | 260/29.6 H |
| 3,669,103 | 6/1972 | Harper et al. | 128/156 |
| 3,810,468 | 5/1974 | Harper et al. | 128/156 |

*Primary Examiner*—Joseph L. Schofer
*Assistant Examiner*—Peter F. Kulkosky
*Attorney, Agent, or Firm*—Benjamin G. Colley

[57] ABSTRACT

Water swellable polyacrylate articles are made from a solution of the polyacrylate having an effective amount of a soluble crosslinking agent therein by heating and/or drying the solution. The polyacrylate solution is made from a polyacrylate by saponification and the cross-linking agent is then added.

9 Claims, No Drawings

METHOD FOR MAKING A CROSSLINKABLE AQUEOUS SOLUTION WHICH IS USEFUL TO FORM SOFT, WATER-SWELLABLE POLYACRYLATE ARTICLES

BACKGROUND OF THE INVENTION

This invention relates to soft, water-swellable articles made from crosslinked polyacrylates, methods for their preparation, and to an aqueous solution of polyacrylates which is useful to make absorbent articles.

It is known from U.S. Pat. Nos. 3,669,103 and 3,670,731 that polymeric sorbents that are crosslinked during polymerization can be used to make disposable diapers, dressings and the like.

It is further known from Ser. No. 371,909, filed June 20, 1973, that water swellable articles can be made from post-polymerization crosslinked polyelectrolytes. However, these articles are generally stiff and brittle and generally require a plasticizer to make a film or casting soft enough to be useful in most applications, expecially in diapers. A disadvantage of using a plasticizer is that the most effective plasticizers are also humectants and make the polyelectrolyte article very sensitive to high humidity.

For example, if polyacrylates are converted through alkaline ester hydrolysis to the corresponding copolymer of the acrylate and acrylic acid salt, as in Ser. No. 371,909, approximately 80 percent or more of the acrylate mers must be so converted before the polymer becomes water soluble. This is attributed to alkaline attack on the polymer particle from the outside in, whereby the polymer molecules on the outside become much more altered by ester hydrolysis than those on the inside of the particle. At the high degrees of hydrolysis then necessary to solubliize all the polymer, the resulting polymer is more akin to a salt of polyacrylic acid than to a polyacrylate. The softness of the original polyacrylate has been replaced by the glassy brittleness of a salt. This brittleness is highly undesirable in water swellable (absorbent) articles.

SUMMARY OF THE INVENTION

It has been discovered that the use of plasticizers can be eliminated in the known post-polymerization crosslinked polyacrylates by providing for the partial saponification of the alkyl acrylate mers in the polymer chains. Thus, when about 30 to about 70 weight percent of the alkyl acrylate mers are left intact in the polymer, the resulting crosslinked article formed from a solution of the partially saponified polyacrylate is soft and flexible without the necessity of adding a special water-soluble plasticizer such as glycerine.

The invention comprises methods of making crosslinkable aqueous solutions, methods of making soft, water-swellable crosslinked polyacrylate films and fibers as well as methods of making an absorbent article coated with a dry water-swellable soft polyacrylate and the products produced by the above methods.

Before the final products can be prepared, it is essential to prepare a solution of the polyacrylate wherein an alkyl acrylate, or a mixture thereof with an alkyl methacrylate, is partially saponified with an alkali metal hydroxide solution. In general, the method of making this solution comprises A. forming a polyacrylate solution having about 30 to about 70 weight percent alkali metal carboxylates by dissolving in an aqueous alkali metal hydroxide solution a polyacrylate comprising
1. about 30 to about 92 percent by weight of an alkyl acrylate wherein the alkyl group has 1-10 carbon atoms, an alkyl methacrylate wherein the alkyl group has 4–10 carbon atoms, or mixtures thereoof;
2. about 8 to about 70 percent by weight of an olefinically unsaturated carboxylic acid, and
3. about 0 to about 15 percent by weight of an omega hydroxy-alkyl acrylate having 1–4 carbon atoms in the hydroxy alkyl group;

B. heating the solution until saponification is complete, and

C. adding to said solution about 0.1 to about 10 weight percent based on the dissolved polymer of a water-soluble crosslinking agent which is reactive with carboxylate salt groups.

The final products of this invention are made by coating a substrate with the above solution or extruding the solution into non-solvents to form fibers both followed by heating and crosslinking the polyacrylates.

The final products of this invention are water-swellable and are useful wherever aqueous solutions need to be absorbed. The present invention is particularly useful to make disposable absorbent articles as an additive to increase absorbency while decreasing the articles' bulk. Examples of the diverse utilities are surgical sponges, tampons, diapers, meat trays, litter mats for household animals and the like.

DETAILED DESCRIPTION

The alkali-soluble polyacrylates useful to form the crosslinkable solutions of this invention can be made by known techniques such as emulsion, suspension, bulk, or solution polymerization techniques, so long as they consist of about 50 to 92 percent by weight of an alkyl acrylate with 1-10 carbon atoms in the alkyl moiety or an alkyl methacrylate with 4–10 carbon atoms in the alkyl moiety, about 8 to about 50 perccent by weight of an olefinically unsaturated carboxylic acid and about 0 to about 15 percent by weight of an omega hydroxy alkyl acrylate having 1–4 carbons in the alkyl moiety.

It is preferred to use alkali-soluble latices having about 15 to about 60 weight percent of non-volatile polymer solids as is set forth below.

Examples of useful alkyl acrylates are methyl acrylate, ethyl acrylate, propyl acrylate, hexyl acrylate and the like. Examples of useful alkyl methacrylates are butyl methacrylates, hexyl methacrylates, octyl methacrylate, decyl methacrylate and the like.

Examples of useful omega hydroxy alkyl acrylates are 2-hydroxyethyl acrylate, hydroxymethyl acrylate, 3-hydroxy-propyl acrylate and 4-hydroxybutyl acrylate.

The foregoing polyacrylates are then dissolved in an aqueous alkali metal hydroxide solution. Generally the equivalents of hydroxide solution used are from about 30 to about 70 percent based on the molar concentration of polymerized monomer and the preferred amount is from about 40 to about 55 percent. In any event, the amount of hydroxide solution added is sufficient to convert or saponify some of the acrylate esters to alkali metal carboxylates and to neutralize the carboxylic groups of the polyacrylate used into alkali metal carboxylates so that the converted polyacrylate has about 30 to about 70 weight percent of alkali metal carboxylates.

This solution is then rendered crosslinkable by adding about 0.1 to about 10 weight percent based on the dissolved polymer of a water soluble crosslinking agent which is reactive or crosslinkable with carboxylate salt groups.

The foregoing aqueous solution can be used per se to prepare the final products of this invention. However, it is sometimes advantageous to add various amounts of volatile monohydric alcohols and/or ketones to control the viscosity of the aqueous solutions and increase the rate of drying. Examples of useful monohydric alcohols are lower alkanols such as methyl alcohol, ethyl alcohol and propyl alcohol. Examples of useful ketones are acetone, and methyl ethyl ketone.

Illustrative examples of the soluble crosslinking agents useful in this invention are polyhaloalkanols such as 1,3-dichloroisopropanol, 1,3-dibromoisopropanol; sulfonium zwitterions such as the tetrahydrothiophene adduct of novolac resins; haloepoxyalkanes such as epichlorohydrin, epibromohydrin, 2-methyl epichlorohydrin and epiiodohydrin; polyglycidyl ethers such as glycerine diglycidyl ether, ethylene glycol diglycidyl ether, propylene glycol diglycidyl ether, diethylene glycol diglycidyl ether; and the mixtures of the foregoing.

The olefinically unsaturated carboxylic acids used in this invention can be mono or poly carboxylic acids.

Examples of the mono-olefinic monocarboxylic acids are acrylic, methacrylic, crotonic, isocrotonic, angelic, tiglic, senecioic or mixtures thereof.

Examples of the mono-olefinic polycarboxylic acids are maleic, fumaric, itaconic, aconitic, teraconic, citraconic, mesaconic, glutaconic.

Compounds containing two or more of the functional groups of the foregoing crosslinking agents would also be useful, as well as precursors which would form these functional groups under the conditions encountered in heating or drying the polyelectrolyte solutions.

Sulfonium zwitterions are known from U.S. Pat. No. 3,660,431, dated May 2, 1972; Ser. Nos. 205,754 and 205,755 both filed on Dec. 7, 1971. The disclosures of this patent and patent applications are incorporated herein by reference.

The crosslinking technique used in this invention to transform water-soluble polyacrylates into insoluble but water-swellable polymers is known as nucleophilic displacement on saturated carbon.

The carboxylate ion on the polyacrylate acts as the nucleophile while the cross-linking agent is the substrate for the nucleophilic attack. Typical leaving groups and their corresponding substrates are listed in Table I. Any combination of two or more of these leaving groups on the same substrate could act as a cross-linking agent for the polyacrylates of this invention.

Table II lists several illustrative compounds used as cross-linking agents in this invention and the operable limits to obtain insoluble but highly swellable polyacrylates according to this invention. Once insolubility is reached, higher levels of cross-linker give polymers which swell in aqueous media to produce firmer, less slippery gels but of lower actual absorbency.

TABLE I

| Leaving Groups in Nucleophilic Displacement (R' = alkyl or aryl) | |
|---|---|
| Leaving Group | Substrate |
| Cl$^-$ | Alkyl chloride R—Cl |
| Br$^-$ | Alkyl bromide R—Br |
| I$^-$ | Alkyl iodide R—I |

TABLE I-continued

| Leaving Groups in Nucleophilic Displacement (R' = alkyl or aryl) | |
|---|---|
| Leaving Group | Substrate |
| HO$^-$ | Alcohol R—OH |
| RO$^-$ | Ether ROR $\overset{O}{\underset{/\ \backslash}{R-R}}$ |
| R'C(O)—O$^-$ | Ester, R—OC(O)—R' |
| $^-$OSO$_2$R' | Alkyl sulfonate R—OSO$_2$R' |
| $^-$OSO$_3$R' | Alkyl sulfate R—OSO$_3$R' |
| $^-$OSOCl | Alkyl chlorosulfite ROSOCl |
| $^-$OPCl$_2$ | Alkyl chlorophosphite R—OPCl$_2$ |
| $^-$OPBr$_2$ | Alkyl bromophosphite R—OPBr$_2$ |
| $^-$OSOR' | Alkyl sulfinite ROSOR' |
| NH$_3$ | Tetraalkyl ammonium ion R—N$^+$R$_3$ |
| N$_2$ | Alkyl diazonium ion R—N$^+$ ≡ N |
| SR'$_2$ | Trialkyl sulfonium ion R—S$^+$R'$_2$ |

TABLE II

| Cross-linking Agents for Polycarboxylates | |
|---|---|
| Cross-linker | Wt. % of Polyelectrolyte |
| 1,3-dichloroisopropanol | 0.4–10% |
| epibromohydrin | 0.5–10% |
| epichlorohydrin | 1–10% |
| glycerine diglycidyl ether | 0.10–45% |
| novolac sulfonium ion | 1–10% |

The rate of nucleophilic displacement is concentation dependent and is a factor in this invention. In solution, when the concentration of the cross-linker is very low, the rate of reaction is quite slow (pot life 10–48 hours before gelation). Once the solution is applied to a substrate surface and evaporation of solvent begins, the rate of cross-linking accelerates. Applying heat at this time increases the reaction rate even more.

If the cross-linking reaction is allowed to proceed in the original solution as by heating, aging, or excessive amounts of cross-linker, the absorbent articles of this invention cannot be fabricated. The solution will become progressively more viscous and stringy until it forms a continuous gel which could not be spread, sprayed or spun.

In the method of making water-swellable films by the present invention the above solution of the polyacrylates is spread on a flat plate or roller of metal, plastic, or other impervious substrate and heated to a temperature greater than 30°C. to crosslink the polyacrylate and drive off the excess water and/or alcohol. The film is then peeled off the plate or roller by a scraper to recover the intact film for subsequent storage or use.

Similarly, when an absorbent article is prepared, the article which is to be the substrate is coated with the solution of the polyacrylate and then the coating is cross-linked. It is to be understood that for the purposes of this invention the coating step implies a complete coating or a discontinuous coating, thus when a fibrous substrate such as cellulose batting, paper, woven or non-woven cloth, and the like are used as the substrate, the solution can be applied in a discontinuous manner, i.e. in a pattern of large dots, squares, or grid lines to retain the inherent flexibility of the fibrous substrate and at the same time vastly improve its water absorbency. Wood pulp can be coated by slurrying it in the polyacrylate solution followed by a fluffing operation.

If desired, the water swellable film prepared as above can be used per se as the inner absorbent layer in baby diapers. It is sometimes advantageous that the film be disintegrated into flakes, strips or powders. This is accomplished by crushing or comminuting the film in a hammer mill, blenders, or the like. If long flat strips are desired, the film can be sliced widthwise with appropriate slicers.

In some instances, water-swellable fibers are desired. These can be prepared by extruding the above solution of the polyacrylates into a bath comprising lower alkyl ketones such as acetone, methyl ethyl ketone, diethyl ketone and the like. Alcoholic solutions may be extruded into a non-aqueous coagulant such as chlorinated hydrocarbons, i.e. methylene chloride, perchloroethylene and the like. The soft extruded fibers are then removed from the bath by any convenient means such as a three or five roll cluster and carried through a heated chamber at a temperature greater than about 30°C. and preferably in the range from about 70° to about 150°C. to dry and to crosslink the polyacrylate fibers.

The absorbency of the crosslinked polyacrylates (grams of solution gelled per gram of polyacrylate) is determined in the following manner using synthetic urine (0.27 N sodium chloride solution).

A 0.5 gram sample of a crosslinked polyacrylate is weighed into a 250 ml. beaker, a 0.27 N sodium chloride solution (150 ml.) is poured into the beaker and allowed to soak for 2 hours at room temperature, with occasional stirring. The swelled polyacrylate is then collected by filtration and the gel capacity is reported as grams of solution gelled per gram of polymer salt.

The following examples are presented solely to illustrate but not limit the invention.

EXAMPLE 1

Three mixtures were made up having the following compositions.

| Part A | Part B | Part C |
|---|---|---|
| 478.0 g. Deionized Water | 338 g. Ethyl Acrylate | 150 g. Deionized Water |
| 0.6 g. Surfactant* | 37 g. 2-Hydroxyethyl Acrylate | 2.3 g. Sodium Bisulfite |
| 2.1 g. Sodium Persulfate | 28 g. Methacrylic Acid | |
| | 8.4 g. Acrylic Acid | |
| | 3.1 g. t-Dodecyl Mercaptan | |

*dioctylsodium sulfosuccinate (Triton GR-5)

Part A was charged to a 2 liter reactor and brought to 40°C. while under vigorous nitrogen purge. Eighteen milliliters of Part B was added to the reactor followed by all of Part C. The remainder of Part B was added over the next 2.5 hours while the temperature was held at 39–41°C. The latex was then digested at 40° for 1.5 hours, cooled to 30° and bottled. The latex contained 39.5 percent non-volatiles.

Four hundred grams of latex prepared above was mixed with 20 g. of sodium hydroxide dissolved in 120 g. of deionized water at 75°C. to give a 30% solution of polymer which was 31.4 percent by weight sodium acrylate and methacrylate. Ten grams of the above solution was mixed with 30 mg. of glycerine diglycidyl ether (1.0 percent curing agent by weight of polymer).

A sheet was cast on mirror-finish chrome plate using a 25 mil draw bar, air dried, and oven cured for 15.5 hours at 70° and 0.5 hour at 90°. This polymer sheet imbibed 23 times its own weight of synthetic urine (0.27 N NaCl solution) in the above absorbency test.

EXAMPLES 2–7

The procedure of Example 1 was repeated with varying amounts of sodium hydroxide and curing agent. The results are shown in Table III along with Example 1.

TABLE III

| Example | Mole % E. A. | Wt.% Curing Agent* | Absorbency** | Film Character |
|---|---|---|---|---|
| 1 | 60.6 | 1.0 | 23 | Very soft |
| 2 | 42.7 | 0.15 | 70 | Somewhat soft |
| 3 | 47.0 | 0.15 | 41 | Soft |
| 4 | 52.0 | 0.15 | 35 | Very soft |
| 5 | 42.7 | 0.25 | 29 | Somewhat soft |
| 6 | 47.0 | 0.25 | 34 | Soft |
| 7 | 52.0 | 0.25 | 22 | Very soft |

E. A. = Ethyl acrylate
Hydroxyethyl acrylate is present in the amount of 8 mole % in all examples.
*Glycerine diglycidyl ether
**In g. 0.27 N NaCl per g. polymer These examples show that softness and absorbency have an inverse relationship. The best all around product of these examples is one containing approximately 50 mole % residual acrylic esters and cross-linked by approximately 0.15 weight % glycerine diglycidyl ether.

EXAMPLE 8

Example 1 was repeated using the following monomer mix, and less initiator and no mercaptan chain stopper in order to raise the molecular weight.

| Part A | Part B | Part C |
|---|---|---|
| 600 g. deionized water | 437.5 g. ethyl acrylate | 175 g. deionized water |
| 0.75 g. Triton GR-5 | 77.2 g. methacrylic acid | 2.0 g. sodium bisulfite |
| 1.75 g. sodium persulfate | | |

The polymerization was carried out at 60°C. and produced a latex of 40.6 percent non-volatiles.

1125 g. of the above latex was added in a small stream over a period of 25 minutes to a slowly stirred solution of 187.16 g. 50% NaOH in 547.9 g. deionized water. After the polymer had all dissolved, the viscous solution was heated at 50°C. for 22 hours to complete the saponification. The resulting solution (25.4 percent solids) had a Brookfield viscosity of 16,200 cps. at 25°C. (No. 5 spindle, 10 rpm). The polymer is 50% ethylacrylate by moles with the remainder being sodium acrylate and methacrylate.

32 g. of the above solution was blended with 16 mg. (0.2 wt.%) of glycerine diglycidyl ether and cast on polished chromium plate with a 25 mil draw bar. After air drying, the film was lifted from the plate and placed in a 150° oven. The absorbency (gel capacity) of the film in 0.27 N NaCl was 64 g. solution per gram polymer after a 20 minute cure. The film was strong and flexible right out of the oven and required creasing in order to tear it.

EXAMPLES 9–12

Eight grams of the saponified solution prepared in Example 8 was mixed with various amounts of 1,3-dichloroisopropanol and films were cast and cured from these mixtures in the manner of Example 8. The gel capacities of the films are set forth in Table IV.

TABLE IV

| Example | Mg. of D.C.I.P. | Wt.% D.C.I.P. Crosslinker | Absorbency* |
|---|---|---|---|
| 9  | 10 | 0.5 | 60 |
| 10 | 12 | 0.6 | 46 |
| 11 | 14 | 0.7 | 40 |
| 12 | 16 | 0.8 | 33 |

D.C.I.P. = 1,3-dichloroisopropanol
*gms 0.27 N NaCl per gm of polymer

These examples show the optimum level of crosslinker using D.C.I.P. is near 0.5 percent by weight of polymer to be cured.

EXAMPLES 13–20

The latex of Example 8 was prepared and saponified with varying amounts of sodium hydroxide in the manner set forth in Example 9 to vary the sodium acrylate content. Eight grams of each solution was blended with different amounts of glycerine diglycidyl ether. Films were then cast on a polished chrome plate, air dried for fourteen hours, and cured for 2 hours at 150°C. in an oven. The absorbency was measured as indicated above and the softness at 45 percent relative humidity noted. The results are shown in Table V.

TABLE V

| Example | Mole % E. A. | Wt.% G.D.E. | Absorbency | Softness |
|---|---|---|---|---|
| 13 | 55 | 0.2   | 44.4 | soft |
| 14 | 52 | 0.2   | 48.8 | soft |
| 15 | 50 | 0.2   | 49.6 | somewhat soft |
| 16 | 40 | 0.2   | 57.2 | brittle |
| 17 | 55 | 0.175 | 52.4 | soft |
| 18 | 52 | 0.175 | 58.8 | soft |
| 19 | 50 | 0.175 | 58.4 | somewhat soft |
| 20 | 40 | 0.175 | 60.0 | brittle |

E. A. = ethyl acrylate
G.D.E. = glycerine diglycidyl ether

These examples show that the unconverted ethyl acrylate portion of the copolymer can be increased to 52 mole % without significant loss in absorbency and a desirably soft product is obtained.

EXAMPLE 21

Three mixtures were made up having the following compositions:

Part A
  230 gms deionized water
  0.3 gms Triton GR-5
  1.0 gms $Na_2S_2O_8$ (sodium persulfate)
  10.0 gms itaconic acid Part B
  20 gms methacrylic acid
  170 gms ethyl acrylate Part C
  70 gms deionized water
  1.25 gms $NaHSO_3$ Part A was charged to a 2 liter reactor and brought to 60°C. while under a vigorous nitrogen purge. Then 20 ml. of Part B was added followed by all of Part C. The remainder of Part B was added continuously over a period of one hour at 60°C. The latex was digested for one hour at this temperature to obtain a final latex having 40.6 percent non-volatiles.

Then, 100 gms of the above latex was mixed with 16.9 gms of a 50 percent aqueous sodium hydroxide solution and 49.1 gms of deionized water and heated at 55°C. for about 10 hours to give a 25 percent solution of polyelectrolyte containing 52 molar percent ethyl acrylate. This polyelectrolyte also was calculated to have
  51% by weight ethyl acrylate
  30% by weight sodium acrylate
  12.3% by weight sodium methacrylate
  6.5% by weight disodium itaconate.

Twenty grams of the above polyelectrolyte was blended with 45 grams water and 7.5 mg. (0.15%) glycerine diglycidyl ether. A film was cast on a mirror finished chrome plate using a 25 mil drawbar and this film was air dried 6.5 hours at room temperature and then oven cured at 150°C. for 16.5 hours. The absorbency of the final cured film was 41 gms/gms of polymer in the above absorbency test with synthetic urine.

Example 21 illustrates that the polymerization recipe and process can be significantly altered but still allow the preparation of highly absorbent polymer.

We claim:
1. A method for making a crosslinkable aqueous solution which is useful to form soft water-swellable polyacrylate articles which comprises
   A. forming a polyacrylate solution having about 30 to about 70 weight percent alkali metal carboxylates by dissolving in an aqueous alkali metal hydroxide solution containing sufficient alkali metal hydroxide to saponify some of the acrylate esters and to neutralize the carboxylic acid groups a polyacrylate comprising
      1. about 30 to about 92 percent by weight of an alkyl acrylate wherein the alkyl group has 1–10 carbon atoms, an alkyl methacrylate wherein the alkyl group has 4–10 carbon atoms, or mixtures thereof,
      2. about 8 to about 50 percent by weight of an olefinically unsaturated carboxylic acid, and
      3. about 0 to about 15 percent by weight of an omega hydroxy-alkyl acrylate having 1–4 carbon atoms in the hydroxy alkyl group
   B. heating the solution until saponification is complete, and
   C. adding to said solution about 0.1 to about 10 weight percent, based on the dissolved polymer, of a water soluble crosslinking agent which is reactive with carboxylate salt groups.
2. The method as set forth in claim 1 wherein the unsaturated carboxylic acid is a poly carboxylic acid.
3. The method as set forth in claim 2 wherein the polycarboxylic acid is selected from maleic, fumaric, itaconic, aconitic, teraconic, citraconic, mesaconic, glutaconic or mixtures thereof.
4. The method as set forth in claim 1 wherein said unsaturated carboxylic acid is a monocarboxylic acid.
5. The method as set forth in claim 4 wherein the monocarboxylic acid is selected from acrylic, methacrylic, crotonic, isocrotonic, angelic, tiglic, senecioic, or mixtures thereof.

6. The method as set forth in claim 1 wherein the water soluble crosslinking agent is selected from polyhaloalkanols, sulfonium zwitterions, haloepoxyalkanes, polyglycidyl ethers, and mixtures thereof.

7. The method as set forth in claim 1 wherein the polyacrylate which is dissolved comprises 85 weight percent ethyl acrylate and 15 weight percent methacrylic acid.

8. The method as set forth in claim 6 wherein the water soluble crosslinking agent is a polyglycidyl ether.

9. The method as set forth in claim 8 wherein the polyglycidyl ether is glycerine diglycidyl ether.

* * * * *

UNITED STATES PATENT AND TRADEMARK OFFICE
CERTIFICATE OF CORRECTION

PATENT NO. : 3,926,891
DATED : December 16, 1975
INVENTOR(S) : James R. Gross et al.

It is certified that error appears in the above—identified patent and that said Letters Patent is hereby corrected as shown below:

Column 2, line 38, "50 to 92" should read -- 30 to 92 --.

Column 8, line 46, " 8 to about 50" should read -- 8 to about 70 --.

Signed and Sealed this

Eleventh Day of December 1979

[SEAL]

Attest:

SIDNEY A. DIAMOND

Attesting Officer    Commissioner of Patents and Trademarks